(12) United States Patent
Bowman

(10) Patent No.: US 6,647,999 B1
(45) Date of Patent: Nov. 18, 2003

(54) POULTRY NEST PAD WASHER AND METHOD

(76) Inventor: James A. Bowman, P.O. Box 334, Sophia, NC (US) 27350

(*) Notice: Subject to any disclaimer, the term of this patent is extended or adjusted under 35 U.S.C. 154(b) by 81 days.

(21) Appl. No.: 10/015,424

(22) Filed: Dec. 13, 2001

(51) Int. Cl.[7] .................................. B08B 3/06
(52) U.S. Cl. ................. 134/119; 134/135; 134/153
(58) Field of Search .................... 134/119, 112, 134/135, 140, 148, 153

(56) References Cited

U.S. PATENT DOCUMENTS

| | | | | |
|---|---|---|---|---|
| 163,034 A | * | 5/1875 | Todd | 134/120 |
| 576,401 A | * | 2/1897 | Gibbs | 426/482 |
| 1,457,284 A | * | 5/1923 | Sells | 15/3.11 |
| 2,399,534 A | * | 4/1946 | Alger | 134/120 |
| 4,120,311 A | * | 10/1978 | Dunham et al. | 134/6 |
| 4,453,386 A | | 6/1984 | Wilkins | |
| 4,682,613 A | * | 7/1987 | DeLoach | 134/58 R |
| 5,029,415 A | * | 7/1991 | Petkov et al. | 451/104 |
| 5,259,560 A | | 11/1993 | Dyer | |
| 5,551,460 A | | 9/1996 | Runion | |

\* cited by examiner

*Primary Examiner*—Randy Gulakowski
*Assistant Examiner*—Saeed Chaudhry

(57) ABSTRACT

A washer and method for cleaning poultry pads or similar items includes a tub which rotates around a horizontal axis. The tub is mounted on a wheeled frame for towing by a car, tractor or other vehicle. Dirty, soiled pads are placed in the tub on-site and the door is then secured. As the tub rotates during its washing cycle the pads are sprayed by water jets positioned along the interior central water conduit. Water collected in a drain is discharged at each revolution through an open gate valve located on the bottom of the drain. Baffles inside the tub agitate the pads and water, thus improving the cleaning ability of the washer.

11 Claims, 5 Drawing Sheets

POULTRY NEST PAD WASHER AND METHOD

FIELD OF THE INVENTION

The invention herein pertains to commercial washing devices and particularly pertains to washers for cleaning poultry pads.

DESCRIPTION OF THE PRIOR ART AND OBJECTIVES OF THE INVENTION

Poultry nest pads as used on poultry farms have generally been formed of synthetic materials in recent years. Such pads are usually more expensive than previous straw and natural fiber pads but are more durable and can be used for longer periods of time. However, such pads become soiled and caked with droppings and other debris and require cleaning to maintain the poultry houses in a safe, sanitary condition. In the past such poultry pads have been cleaned by passing them along a conveyor having a high pressure spray as shown in U.S. Pat. No. 5,551,460. Other pad cleaning devices are illustrated in U.S. Pat. Nos. 5,259,560 and 4,453,386. However, it has been found that high pressure spraying will not completely remove the droppings and debris due in part to the thickness of the poultry pads. Also, crushing or pulverizing the droppings during the cleaning process likewise does not thoroughly clean the pads since pulverizing sometimes increases, rather than decreases the tenacity of the attached debris.

Thus, in view of the problems and disadvantages associated with prior art cleaning methods and equipment, it is an objective of the present invention to provide a poultry pad washer which can be easily conveyed such as by a vehicle from one location to another and can be set up and operated on site by a single worker.

It is yet another objective of the present invention to provide a poultry pad washer which has a large capacity and is quick and efficient in its cleaning operation.

It is still another objective of the present invention to provide a poultry pad washer which has a rotatable tub to "tumble" the poultry pads during the washing process.

It is yet another objective of the present invention to provide a poultry pad washer having pivotal side guards to protect from inadvertent accidents and injury during washing.

It is a further objective of the present invention to provide a poultry pad washer which can be easily emptied and refilled after washing for the next washing cycle.

Various other objectives and advantages of the present invention will become apparent to those skilled in the art as a more detailed description is set forth below.

SUMMARY OF THE INVENTION

The aforesaid and other objectives are realized by providing a washer for poultry pads and the like which has a wheeled frame and a vehicle hitch affixed thereto. Positioned on the frame is a tub which rotates around its horizontal axis as defined by a central interior water conduit. Pivotal side guards are mounted on each side of the washer tub to prevent accidents and injuries to workers as the tub rotates. In use, the washer is pulled by a vehicle such as a pickup truck to a suitable location near a poultry barn. A water source such as a well or the like is then located and a hose such as a conventional garden hose is then connected to the water source and to an electric booster pump mounted on the frame which in turn is connected to a 110V power source. The door on the tub is opened and soiled poultry pads (300–400) are placed therein. The door is then secured and the small horsepower (5½ hp) drive engine, which may be gasoline or diesel but could also be an electric motor, is then started and the pump is activated. As the tub rotates the central water conduit sprays the tumbling pads with water. A drain gate valve at the bottom of the tub remains opened to allow dirty water to continuously exit at each tub revolution. Baffles within the tub provide agitation to the pads as they are tumbled. Once a sufficient time has passed (such as twenty minutes depending on the number of pads washed), the engine is stopped and the pump turned off. The tub door is then opened and the washed pads are removed for drying. Additional dirty pads are then placed in the tub and the wash cycle is repeated.

DETAILED DESCRIPTION OF THE PREFERRED EMBODIMENTS AND OPERATION OF THE INVENTION

Figure 1:
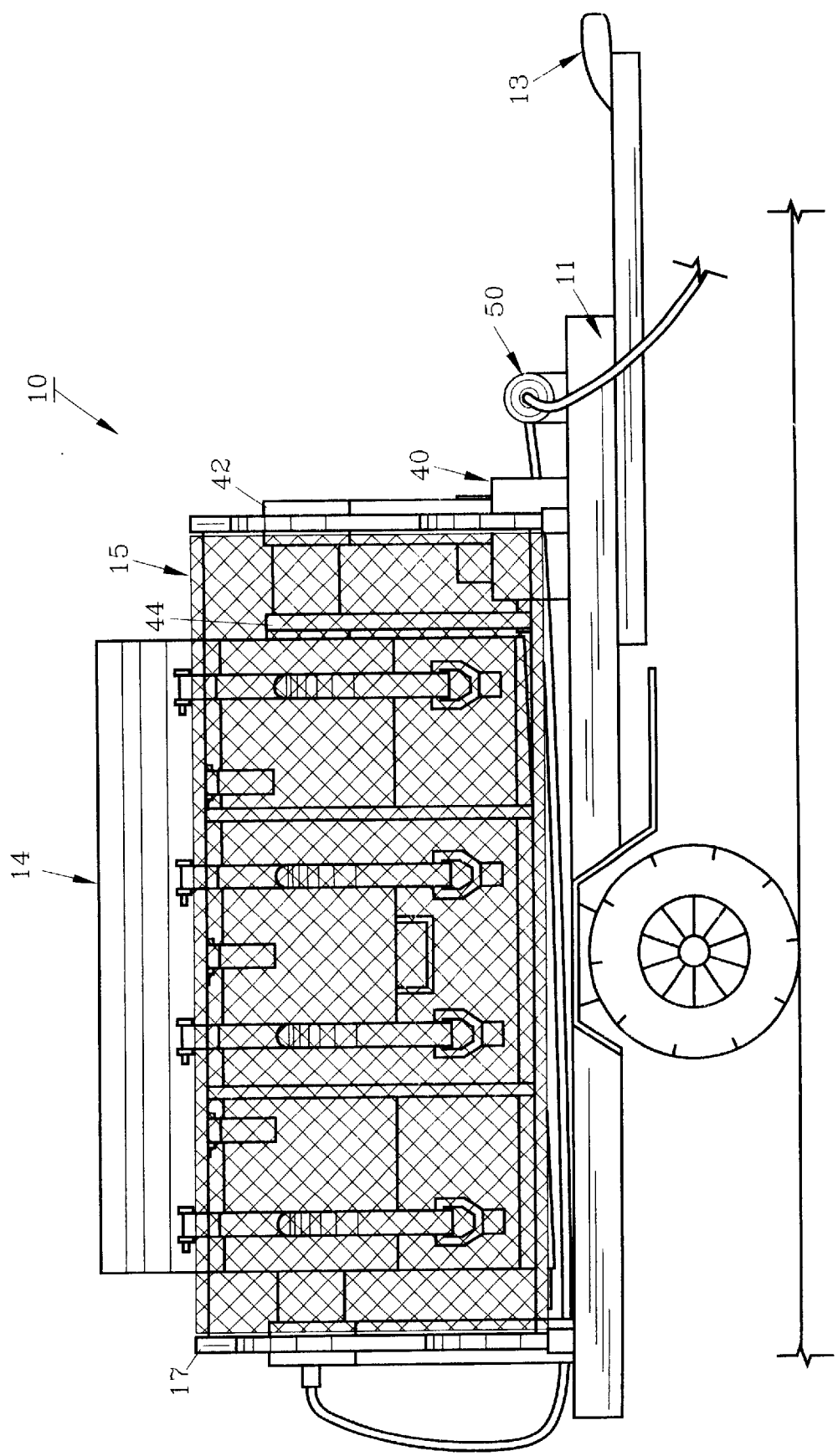
FIG. 1 demonstrates a side elevational view of the poultry pad washer with the guard in a closed position and the tub door closed.
Figure 2:
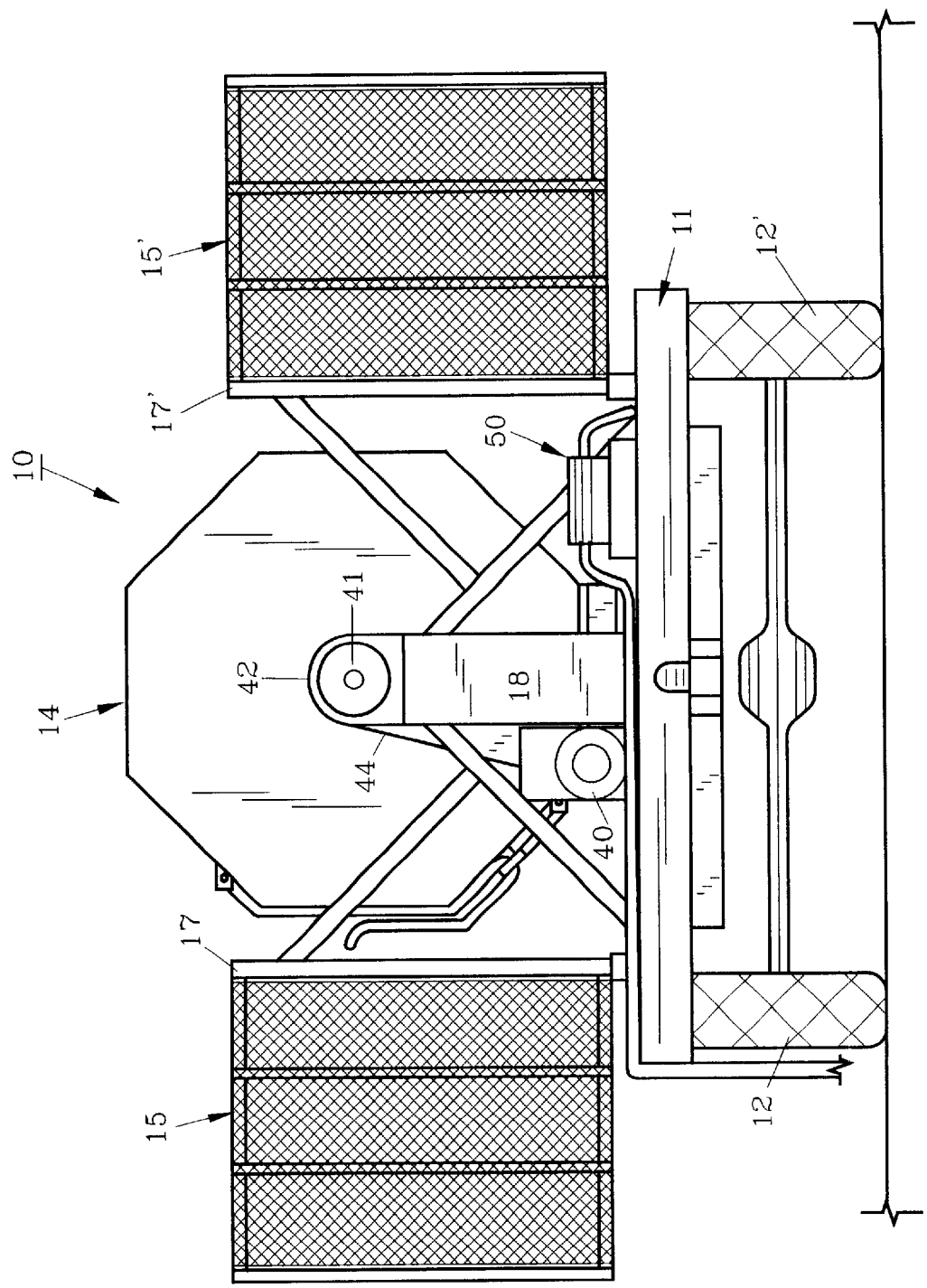
FIG. 2 illustrates a front elevational view of the washer as shown in FIG. 1 with the side guards partially opened.
Figure 3:
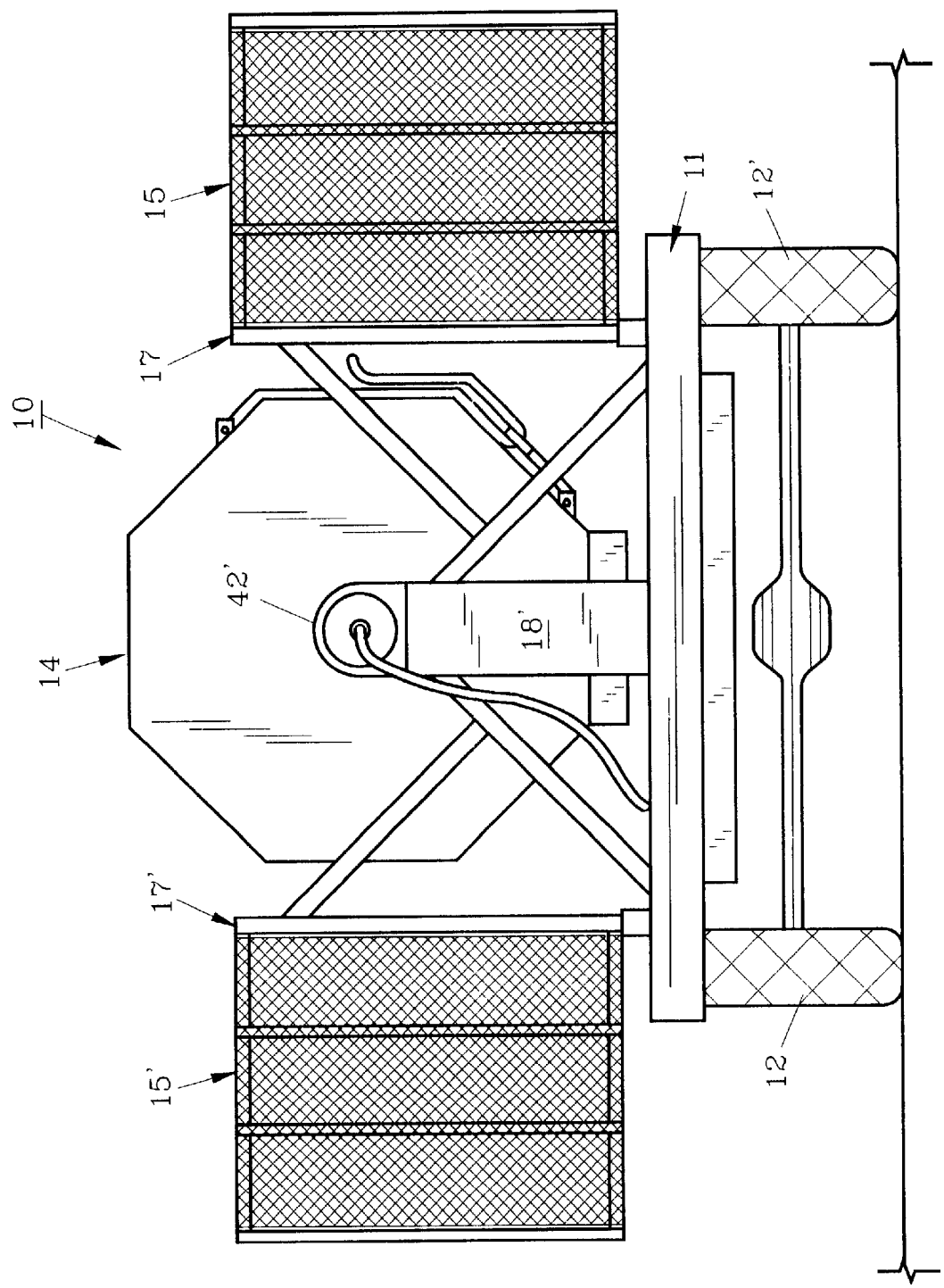
FIG. 3 shows a rear elevational view of the tub washer as shown in FIG. 2.

For a better understanding of the invention and its operation, turning now to the drawings, preferred pad washer 10 is shown in FIG. 1 having frame 11 which is preferably 13' long (3.96 m) and 5' wide (1.524 m) with wheels 12, 12' (FIG. 2) attached for towing by vehicle hitch 13. Rotatably positioned on frame 11 is washer tub 14, having side guards 15, 15' which rotate or open about posts 17, 17' (FIG. 3) respectively. Side guards 15, 15' which include screen wire are thus pivotally joined to frame 11 and can be opened as seen in FIG. 2 about one-half open or closed as shown in FIG. 1. Normally, side guard 15' remains closed at all times, whereas side guard 15 can be opened for loading and unloading poultry pads into tub 14. Tub 14 has a preferred length of 6' (1.828 m) and an overall diameter of 4' (1.22 m) and is formed such as by welding from thin steel plate stock.

Figure 5:
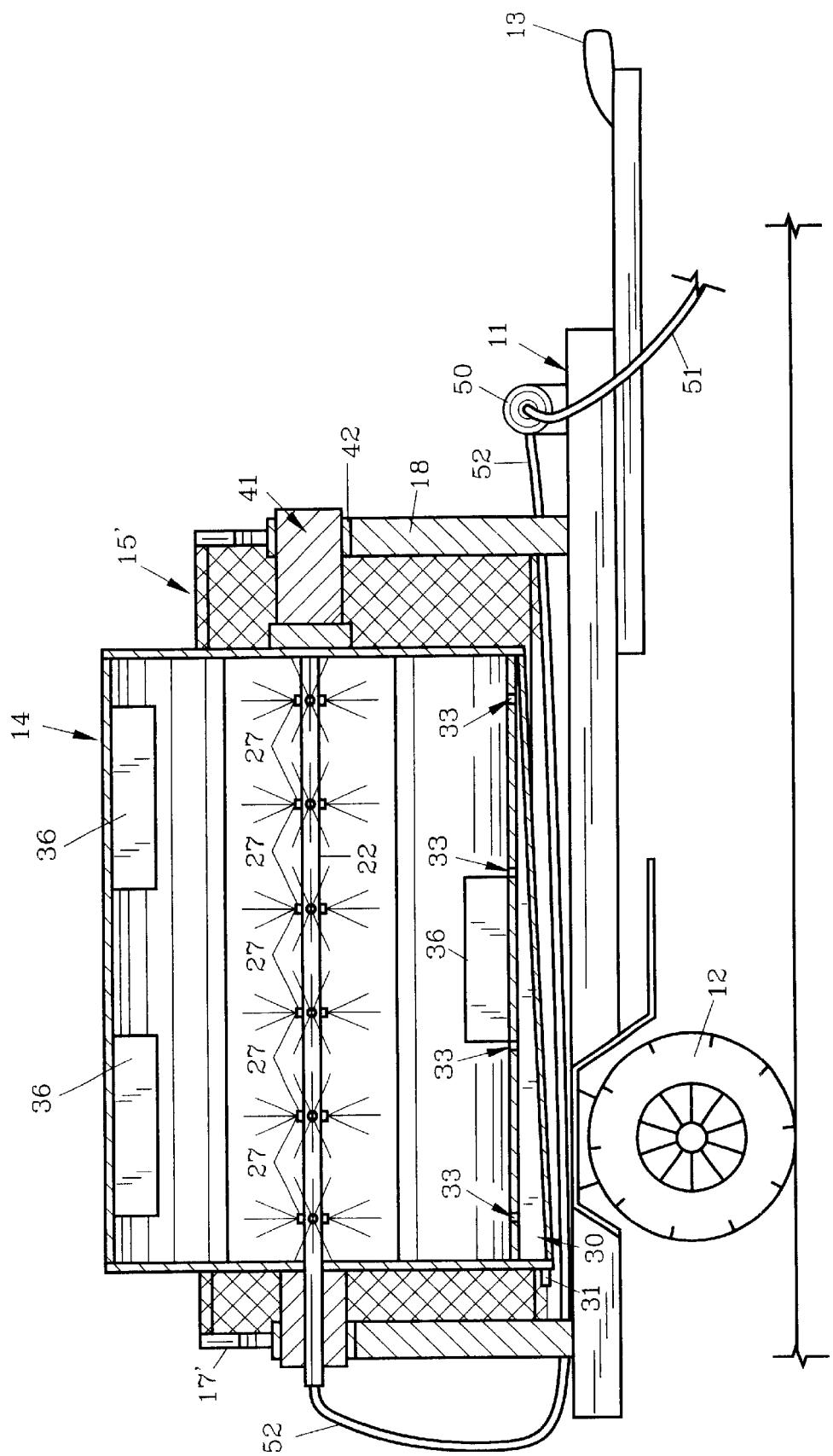
FIG. 5 depicts a side view of the washer as shown in FIG. 1 with the side guards removed and with the tub and other components seen in cross-section.

Tub 14 is supported by bearings 42, 42' on stanchions 18, 18' respectively which are rigidly affixed to frame 11 (FIGS. 2 and 3) for rotation around the horizontal axis of tub 14 as defined by water conduit 22 (shown in FIG. 5).

Figure 4:
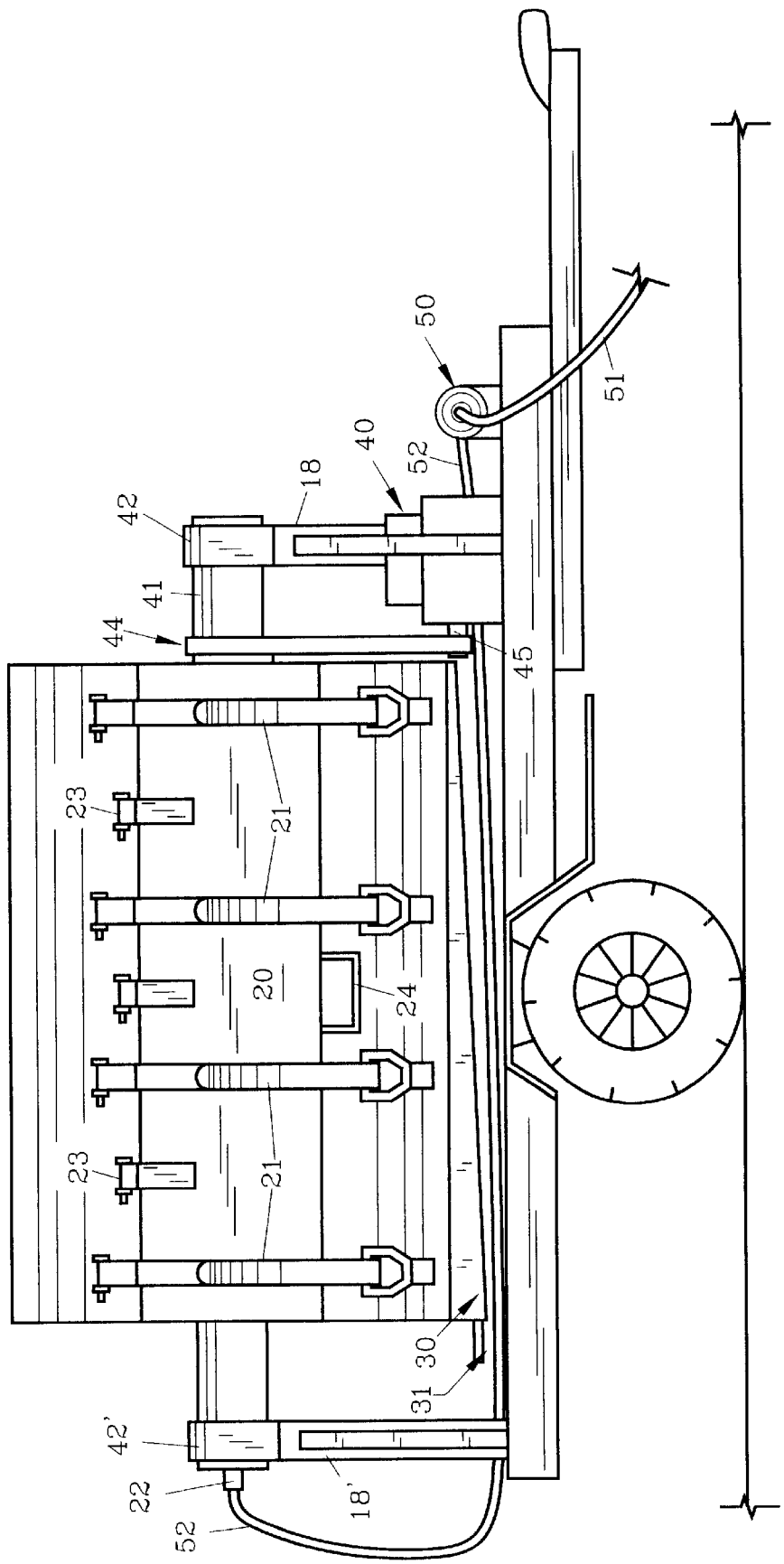
FIG. 4 features a side elevational view of the washer with the side guards removed for clarity.

Tub door 20 as seen in FIG. 4 includes a series of securing straps 21, preferably four, and a plurality (preferably three) of hinges 23. Handle 24 is used to manually open door 20 for loading and unloading purposes. Tub drain 30 is wedge-shaped and is affixed to the bottom of tub 14, as also shown in FIG. 4. Gate valve 31 which has a 3" (7.62 cm) opening can be manually opened and closed. Water contained within tub 14 is easily and quickly dumped each time the tub rotates through gate valve 31 which is open during the washing cycle and which can be closed when not in use. Along the bottom of tub 14 as shown in FIG. 5 are a series of 1.5" (3.8 cm) openings 33 which allow water to flow into drain 30.

Jets 27 are positioned on water conduit 22 which is preferably 2" (5.08 cm) schedule 80 pipe and provide a high pressure spray as items such as poultry pads therein are tumbled as tub 14 rotates. Baffles 36 which are approximately 42" (106.68 cm) long and approximately 12" (30.48 cm) high formed from ¼" flat plate steel extend radially into tub 14 and provide agitating action to the water and pads within tub 14.

Tub 14 is driven by preferably, a small Honda 5½ hp gasoline internal combustion engine 40 as shown in FIG. 4, although an electric motor, or diesel engine or other engines may also be used. Engine shaft 45 is joined by chain drive 44 to front tub shaft 41 which is rigidly affixed to tub 14 such as by welding or the like. Front shaft 41 is mounted within bearing 42 atop stanchion 18 as earlier discussed. Chain drive 44 is connected to engine shaft 45 which rotates a chain (not seen) of chain drive 44.

Conventional 110V electric booster pump 50 mounted on frame 11 increases the water pressure from a well or other water source (not shown) which it receives through inlet pipe 51 (FIG. 4). Pump 50 thereafter directs the water through outlet pipe 52 which is connected to central water conduit 22 as seen in FIGS. 4 and 5. High pressure water so delivered passes through spray nozzles 27 where it impinges pads or other items contained within tub 14 during the washing cycle.

The preferred method of using washer 10 includes the steps of towing washer 10 to a convenient site by car, truck or other vehicle. Once conveniently located and stabilized with standard screw jacks, or the like (not seen) as needed, an electrical connection is made with pump 50 and a water source such as a well is located for inlet pipe 51. Next, side guard 15 is then opened for easy access to door 20 which is approximately 64" (162.56 cm) long and 20" (50.8 cm) tall. Securing straps 21 are then removed and door 20 is manually opened using handle 24. Soiled, dirty poultry pads or other items are then placed into tub 14 whereupon door 20 is then closed and secured with straps 21. Side guard 15 is repositioned (closed) for safety purposes. Next, pump 50 having been supplied with a water source or reservoir is then turned on. Thereafter, engine 40 is started and tub 14 is allowed to rotate thus spraying, tumbling and cleaning the soiled pads therein. Detergents or other cleaning assistants can be added during loading of the poultry pads as desired. Gate valve 31 has been opened to drain the dirty water therein during each revolution of tub 14. Preferred tub 14 which is approximately 72" (182.88 cm) long and 48" (121.92 cm) in diameter, will hold approximately 300–400 pads and will take approximately twenty minutes to thoroughly clean about 400 pads. Once sufficient time has passed, depending on the number of pads loaded, pump 50 is turned off as is motor 40. Side guard 15 is opened (pivoted away from tub 14), as is door 20, and the washed pads therein removed. Additional pads can be added and the wash cycle steps repeated as often as needed. Thereafter, gate valve 31 can be closed, electrical and mechanical disconnections made as needed, the screw jacks removed, and washer 10 can then be moved to a new location.

The illustrations and examples provided herein are for explanatory purposes and are not intended to limit the scope of the appended claims.

I claim:

1. A washer comprising: a frame, a tub, said tub rotatably mounted on said frame, a side guard, said side guard attached to said frame, a water conduit, said water conduit positioned in said tub, a spray jet, said spray jet communicating with said water conduit for spraying items in said tub.

2. The washer of claim 1 further comprising a baffle, said baffle positioned in said tub to agitate items therein as said tub rotates.

3. The washer of claim 1 further comprising an engine, said engine connected to said tub for rotating the same.

4. The washer of claim 3 further comprising a chain drive, said chain drive connected to said motor, said chain drive for rotating said tub.

5. The washer of claim 1 further comprising a pump, said pump mounted proximate said frame for delivering water to said water conduit.

6. The washer of claim 1 wherein said side guard is pivotally attached to said frame.

7. The washer of claim 1 further comprising a pair of wheels, said wheels attached to said frame.

8. The washer of claim 1 further comprising a vehicle hitch, said vehicle hitch attached to said frame.

9. A washer for transportation to a field site for cleaning pads thereat comprising: a frame, a side guard, said side guard attached to said frame, a pair of wheels, said wheels joined to said frame, a vehicle hitch, said vehicle hitch joined to said frame for connecting to a vehicle for pulling the same, a rotatable tub, said tub mounted on said frame, a pump, a water conduit, said water conduit positioned in said tub, said pump connected to said water conduit, and a motor, said motor connected to said tub to rotate the same.

10. The washer of claim 9 further comprising:
   a chain drive, said motor and said tub joined to said chain drive.

11. The washer of claim 9 wherein said side guard is pivotally joined to said frame.

* * * * *